United States Patent [19]

Cornish

[11] 4,253,248
[45] Mar. 3, 1981

[54] TEACHING MACHINE APPARATUS

[76] Inventor: Judson E. Cornish, Box 256, LaJolla, Calif. 92038

[21] Appl. No.: 30,575

[22] Filed: Apr. 16, 1979

[51] Int. Cl.³ .............................................. G09B 5/02
[52] U.S. Cl. .................................... 434/227; 434/178
[58] Field of Search .................... 35/6, 8 R, 9 R, 9 H, 35/35 R, 35 B

[56] References Cited
U.S. PATENT DOCUMENTS

| | | | |
|---|---|---|---|
| 3,121,960 | 2/1964 | Uttal et al. | 35/9 R |
| 3,281,959 | 11/1966 | Kobler et al. | 35/9 R |
| 3,477,142 | 11/1969 | Cornel et al. | 35/9 B |
| 3,680,224 | 8/1972 | Hall | 35/9 E |
| 3,869,810 | 3/1975 | Ronalds | 35/9 C |
| 3,894,346 | 7/1975 | Ward et al. | 35/8 R |
| 4,044,475 | 8/1977 | Fujisawa et al. | 35/6 |

*Primary Examiner*—Charles N. Hart
*Assistant Examiner*—David R. Sadowski
*Attorney, Agent, or Firm*—James Creighton Wray

[57] ABSTRACT

Printed matter is positioned behind a reflective and transparent surface. A lamp illuminates the printing. A student is instructed to copy the material on a typewriter. When a student begins typing, the lamp turns off and remains off until a predetermined interval after typing has stopped. The lamp relights, displaying the printed matter through the printed matter screen and when the student begins typing again the lamp turns off, hiding the printed matter. The process is repeated until the task is completed or a preselected time expires.

The student is encouraged to type more during each successive interval, which encourages the student to remember words and groups of words and to comprehend.

11 Claims, 4 Drawing Figures

TEACHING MACHINE APPARATUS

BACKGROUND OF THE INVENTION

Recent research on learning, the work of B. F. Skinner, shows that behavior can be changed by its consequences and that immediate feedback to the learner is much more effective than feedback that is delayed. In the teaching of language or other skills, e.g. reading, writing, etc., feedback usually is delayed and often is not related directly to the skill that needs improvement. For example, reading and writing tests are returned to the student after a long time and following such a complex tangle of events, that it is not clear to the student what exactly he was doing wrong. Sometimes on a reading test a student can achieve a high score by skimming the text or guessing on the multiple choice questions afterwards. In the early grades of school where reading and writing development begins, the average time spent reading with individual help from a teacher who provides direct feedback may average less than twenty seconds per day, from a study by R. Vance Hall at the University of Kansas.

SUMMARY OF THE INVENTION

The invention provides continuous automatic feedback to a student directly from his reading and writing behavior. The invention requires a student to look at reading material, remember accurately what he has seen and write it all out on a typewriter. A numerical display in front of him tells him exactly how much time he has spent looking and how much of the text he has remembered correctly. The number gets bigger whenever he looks quickly and remembers more. The only way a student can remember more than a few letters without taking time to memorize is to read. The only way he can remember more than a few words at a time is to read with comprehension. He must remember vocabulary, spelling, punctuation and syntax to reproduce the writing correctly. The result is that the student working at the machine must read and write better to get a better score on the display. The instantaneous feedback of this invention reinforces whatever improvements the student makes in his language skills. No human tutor could possibly provide such close supervision and rapid calculation of language skill improvement even on a one to one basis. It is doubtful that any tutor would work with such patience and responsiveness.

The student is shown a text and told to copy it on the typewriter. The moment he begins typing, the text disappears. When he stops typing, the text reappears. The student cannot, therefore, copy what he is looking at. He must copy from short-term remembering. The machine records every keystroke on the typewriter, every appearance and disappearance of the text and elasped time reading and typing. A score instantly calculated from these variables is displayed to the student. Since better spelling and better reading comprehension, etc., will increase the amount of text that can be typed accurately from short term memory, the machine displays a score which will correlate with increased reading comprehension and improved writing skills. Thus, immediate and relevant feedback is achieved for language skill development.

A transparent mirror is between the student and the text. A light on behind the mirror makes the text visible; the same light off makes the text invisible. A switch installed on the typewriter closes every time a key is typed and turns the light off. The light stays off until the student stops typing. A micro-computer has been programmed to receive the information from the keystroke switch. It counts the keystrokes, keeps track of time spent reading (light-on time) or typing (light-off time) and performs various calculations with these variables. The results can be displayed in terms of the number of words typed (keystrokes ÷ 5), words typed per minute (words ÷ time spent typing), words read per minute (words ÷ time spent reading), words remembered (words ÷ number of looks), or any formulas using these variables.

The present machine may be programmed to take instruction from a hex decimal keyboard, on which one can vary the content of the display and the sequence of calculations. The same results could be achieved by having the text programmed into a computer and programming the computer to make the text appear and disappear as the student types and to display and calculate data.

Any text at all, however, can be put into the present machine. A student simply brings an interesting book to class and uses it. Each test would have to be fed into a computer before it could be used, so that much of the capability of the computer would be allocated to performing the function adequately performed by a book in the present machine. The machine in the present invention is only capable of performing the vital functions of reading development—showing improvements in speed of assimilation and retention of textual material and so it is comparatively simple and inexpensive.

The transparent mirror which is used could be replaced with liquid crystal which changes from opaque to transparent with an electrical charge or with other devices which could control the visibility of the text.

The language teaching machine deals with reading and writing in a greatly simplified way. It is based on the realization that language skills, complex as they may seen, can be measured and dealt with in terms of keystrokes over time and that short-term remembering transforms looking or listening behavior into learning behavior.

The language teaching machine study carrel includes a chair, a shelf holding a typewriter, a shelf with an open book, two lights, one shining on the book and one shining on paper in the typewriter, a shelf holding a transparent mirror pulled up and out of sight, a top shelf with a micro-computer and two digital displays.

The transparent mirror is pulled down to cover the book. The book is visible through the mirror when the internal light is on. A child uses the machine to improve reading and writing with the book light alternately on and off.

An object of the invention if the provision of a teaching machine with a support for printed matter, means for hiding the printed matter from a student, means for disclosing the printed matter to a student, student response input for responding to the printed matter and a control connected to the response input and to the disclosing means for disclosing printed matter on the support means according to operation of the response means.

Another object of the invention is the provision of a teaching machine with a control connected to a disclosing means and to a response input for disclosing printed matter on a support to a student while the response input is not being operated.

A further object of the invention is the provision of a teaching machine with a delay connected to a control to a response means and to disclosing means for delaying operation of the disclosing means for a predetermined interval after operation of the response is terminated.

One object of the invention is the provision of a teaching machine with a variably transparent viewing means and a transparency control connected to a control means.

Another object of the invention is the provision of a teaching machine with a plate having transparent and reflective characteristics, a support for printed matter positioned behind the plate and illumination means mounted behind the plate for controlling illumination behind the plate.

Another object of the invention is the provision of a teaching machine with a lamp mounted behind a reflective plate, which is movable for changing printed matter. The plate of one embodiment is liftable and slideable between parallel supports for holding the plate in lifted position.

A further object of the invention is the provision of a teaching machine with a control operably connected to a keyboard to hide printed matter from view when the keyboard is operated and to disclose the printed matter for view after the keyboard has ceased to be operated.

An object of the invention is the provision of a teaching machine with an enclosure and a reflective and transparent mirrored plate and a support for printed matter mounted within the enclosure, a lamp within the enclosure for illuminating printed matter on the support, a typewriter mounted beneath the enclosure and a control connected to the typewriter and to the lamp for turning off the lamp when the typewriter is being operated and for lighting the lamp after a predetermined time interval after operation of the typewriter discontinues.

Another object of the invention is the provision of a teaching machine which has a first counter connected to a lamp for counting a number of times the lamp is turned on, a second counter connected to a typewriter for counting a number of strikes of the typewriter, a comparator connected to the first and second counters, a timer connected to the comparator and a display connected to the comparator.

One object of the invention is the provision of a teaching machine, the method of teaching including instructing a student to respond to printed matter, displaying printed matter, hiding the printed matter when a student responds to the printed matter and disclosing the printed matter to the student after the student stops responding to the printed matter.

Another object of the invention is the provision of a teaching machine, the method which places printed matter behind a screen having controllable transparency and makes the screen opaque when a student responds and transparent after the student stops responding. The making the screen transparent in one embodiment comprises illuminating a space behind the screen.

A further object of the invention is the provision of teaching method which includes typing and wherein printed matter is hid from a student during typing and wherein printed matter is disclosed to a student a predetermined time interval after the typing is discontinued. Preferably, the number of times the material is disclosed to the student is determined.

Another object of the invention is the provision of a teaching method which includes counting the number of times printed matter is disclosed to a student, counting the number of strokes of a typewriter, counting the length of time that printed matter is displayed to the student and timing the typewriter use by the student, comparing the counts and times and displaying values according to the counts and times.

The above and further objects and features of the invention are apparent in the disclosure which includes the above and ongoing specification and claims and the drawings.

DETAILED DESCRIPTION OF THE DRAWINGS

Figure 2:
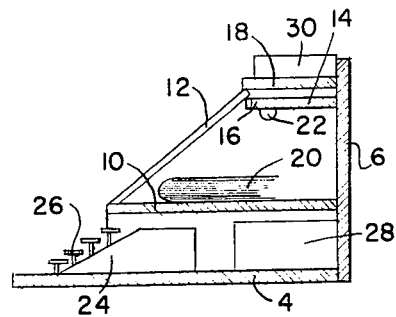
FIG. 2 is a cross-sectional view of the teaching machine shown in FIG. 1.
Figure 1:
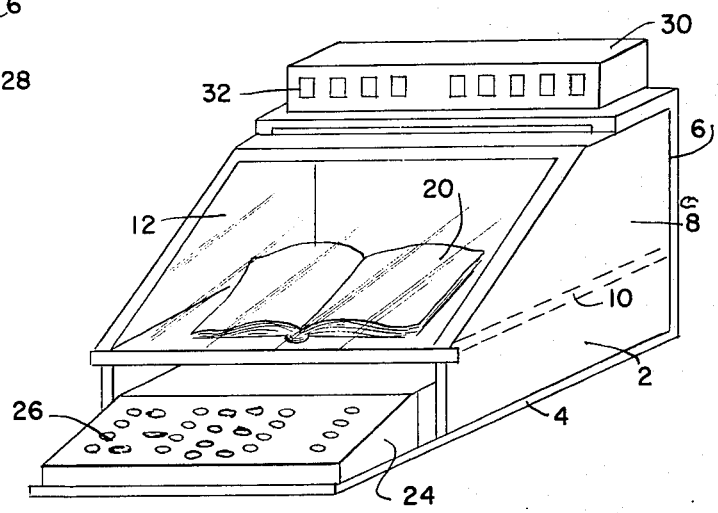
FIG. 1 is a perspective view of a teaching machine.

As shown in FIGS. 1 and 2, a preferred embodiment of the invention uses a teaching machine generally referred to by the numeral 1. The teaching machine has a body 2 with a base 4 and a back 6. Sidewalls 8 complete an enclosure.

Shelf 10 supports printed matter to be used with the teaching machine. A controllably transparent and opaque or reflective plate 12 controls visual access to the printed matter. The plate rests against a forward edge 16 of shelf 14. Upper shelf 18 cooperates with shelf 14 to provide an intermediate space into which the plate 12 may be slid so that shelves 14 and 18 support the plate while the printed matter is being changed.

The printed matter shown in FIGS. 1 and 2 is a book 20 which is illuminated by light 22. A keyboard device, in this case a typewriter 24, has keys 26. A control box 28 connects the typewriter 24 and the lamp 22 and display 30 which has electrically controlled alphanumeric display characters 32.

Figure 3:
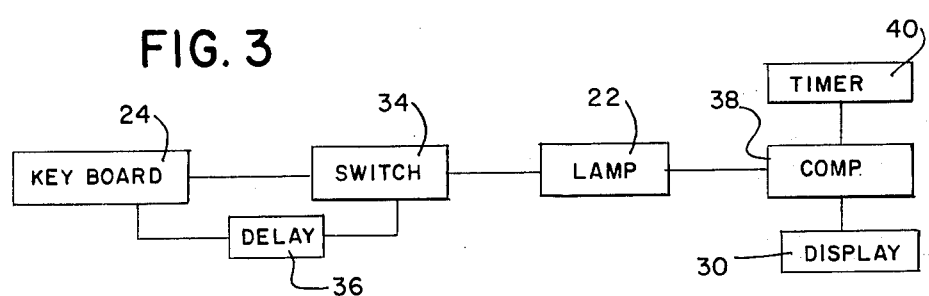
FIG. 3 is a schematic representation of elements of the invention and steps in their use.

As shown in FIG. 3, the keyboard 24 controls a switch 34 through delay 36. When the keyboard is in use, switch 34 is turned off. When the keyboard use stops, a delay 36 causes the switch 34 to close, lighting lamp 22. A comparator 38 causes the display 30 to indicate a value according to the number of times the lamp is lit. Fewer lightings cause a more desired value to be displayed.

Timer 40 may be connected to the comparator to control the display according to time used.

Figure 4:
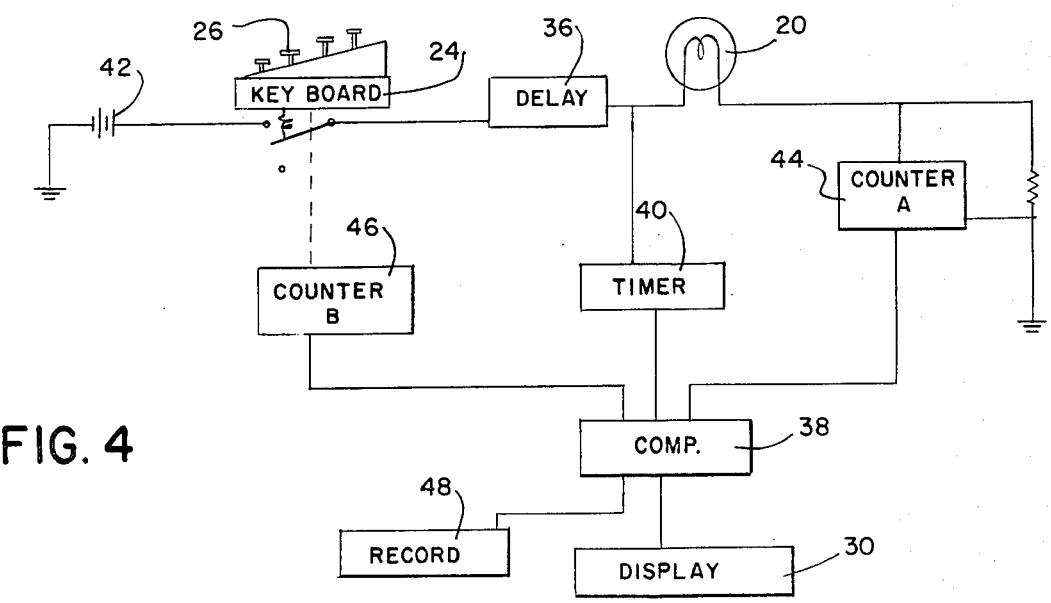
FIG. 4 is a schematic representation of elements of an embodiment of a teaching machine showing its relations.

FIG. 4 shows a similar use of the present invention. Timer 40 is connected to the power supply line of lamp 20 to sense the amount of time that the lamp is lit. By sensing the amount of time the lamp is lit, timer 40 also senses the amount of time that the lamp is not lit, ergo, the time that keyboard 24 is being used. Power supply 42 supplies power to a switch 34. Use of keys 26 of keyboard 24 opens switch 34 to extinguish light 20. Delay 36 delays power to light 20 until switch 34 has been closed for a predetermined interval which is the delay of element 36. Then lamp 20 lights, illuminating the printed matter. Counter 44 indicates the number of times lamp 20 is lit or the number of times lamp 20 is extinguished. Counter 44 counts the strikes of keys 26. Comparator 38 controls the display 30 according to the amount of time the lamp remains on, the number of times the lamp turns on and the number of strikes of keys 26. Recorder 48 is controlled by comparator 38 to make a record of the instantaneous values displayed on display 30 and to record the counts of the counters and the related timer times when desired.

The material which is typed may be reviewed periodically by an advisor for relation to the material being read or for accuracy and the advisor may weigh the displayed values.

The comparator operates to increase the desired display value according to reduced counts from counter A44, increased counts from counter B46 and reduced light on times from timer 40.

In extensions of the device, the output of keyboard 24 which is typed material may be optically compared with the printed material which the typed material is intended to copy or the printed material and keyboard output may be directly electronically compared.

The broad objectives of the invention are accomplished by a providing means which controllably and alternately hides and discloses material which a student is called upon to read and by controlling the hiding and disclosing of the material according to the student's response, particularly hiding the material when the student responds and disclosing the material when the student ceases to respond.

The hiding and disclosing may be accomplished in many ways, for example mechanically by opening and closing shutters or by transporting printed material from a readable position to a non-readable position, optically by changing illumination of the material or by focusing or de-focusing the material or by projecting the material onto a screen and not projecting the material onto a screen, chemically by rendering a screen opaque and transparent and electronically by causing a material to be visible on or through a screen.

The means for supporting printed matter is typically any means which supports printed matter in a position conveniently read by the student.

The student response means is preferably a keyboard type response means such as a typewriter which directly prints or otherwise records keyboard inputs or which electronically records or senses inputs.

The control means which connects the response means with the hiding and disclosing means may take any convenient form. For example, the control means may be mechanical linkage between keys and a switch, which mechanically opens a switch each time a key is depressed. The switch may be plural serially connected switches each connected to a key so that the circuit is opened by depressing a key. The switch means may be for example a pressure or impact sensitive electric switch which senses printing impulses. The switch means may be an electrical device which senses electrical inputs from keys of an electric response means such as an electric typewriter.

One or more well known counters may be employed. For example, the counters may be mechanical counters mechanically connected to typewriter keys and mechanical switches or may be electrical counters which count mechanical operations through microswitches or which count electric voltage or current variations.

Any convenient form of a comparator may be used. A comparator may be a summing device which increases an output value directly in relationship to inputs from counter A as a measure of keyboard activity. The summing device may decrease the output value according to inputs from counter B or timer 40 or both.

The display may be a mechanical display device or more preferably a conventional alphanumeric electrical display.

The broad objects of the invention are accomplished simply by using a student response input means which controls the viewing of printed matter.

The benefits of such a basic system are increased by the simple addition of a counter such as counter A, 44, which counts the number of times the printed material is displayed.

The benefits of the basic device are also improved by the provision of timer 40 which simply times the display of the printed material.

The benefits of the basic device are also increased by the simple addition of counter B which counts responses.

While the invention has been described with reference to specific embodiments, it will be obvious to those skilled in the art that modifications and variations of the invention may be constructed without departing from the scope of the invention.

The scope of the invention is described in the following claims.

I claim:

1. Teaching machine apparatus comprising means for supporting printed matter, means for hiding and disclosing the printed matter to a student comprising a variably transparent viewing means comprising a plate liftable and slidable between parallel supports for holding said plate in a lifted position, student response input means for inputting response to the printed matter, control means connected to the response means and to the disclosing means for disclosing printed matter on the support means according to operation of the response means.

2. The teaching machine apparatus of claim 1 wherein the control means is connected to the disclosing means and to the response means for disclosing the printed matter on the support means to a student while the response means is not being operated.

3. The teaching machine apparatus of claim 2 further comprising delay means connected to the control means, response means and disclosing means for delaying operation of the disclosing means for a predetermined interval after operation of the response means is terminated.

4. The teaching machine apparatus of claim 1 wherein the means for hiding printed matter from a student and means for disclosing the printed matter to a student comprise variably transparent viewing means and wherein the means for disclosing the printed matter to a student further comprises a transparency control connected to the control means.

5. The teaching machine apparatus of claim 4 wherein the variably transparent viewing means comprises a plate having transparent and reflective characteristics, wherein the means for supporting printed matter is positioned behind the plate and wherein the transparency control comprises illumination means mounted behind the plate for controlling illumination behind the plate.

6. The teaching machine apparatus of claim 5 wherein the illumination means comprises a lamp mounted behind the plate.

7. The teaching machine apparatus of claim 6 wherein the plate is movable for changing the printed matter.

8. The teaching machine apparatus of claim 1 wherein the response means comprises keyboard means and wherein the control means is operably connected to the keyboard means illumination means, display means, delay means to hide by unillumination the printed matter from view when the keyboard means is operated and to disclose by illumination the printed matter for view after the keyboard has ceased to be operated.

9. The teaching machine apparatus of claim 1 wherein the means for hiding comprises an enclosure and a reflective and transparent mirrored plate liftable and slidable between parallel supports for holding said plate and wherein the means for supporting printed matter is mounted within the enclosure, wherein the disclosing means comprises a lamp within the enclosure for illuminating printed matter on the supporting means, wherein the response means comprises a typewriter mounted beneath the enclosure and wherein the control means includes means connected to the typewriter and to the lamp for turning off the lamp when the typewriter is being operated and for lighting the lamp after a predetermined time interval after operation of the typewriter discontinues.

10. The teaching machine apparatus of claim 9 further comprising a first counter connected to the lamp for counting a number of times the lamp is turned on, a second counter connected to the typewriter for counting a number of strikes of the typewriter, a comparator connected to the first and second counters, a timer connected to the comparator and a display connected to the comparator.

11. The apparatus of claim 10 further comprising a record device connected to the comparator.

* * * * *